T. B. SWAN.
Seed Planter.

No. 201,715.  Patented March 26, 1878.

WITNESSES:
Chas. Nida
C. Sedgwick

INVENTOR:
T. B. Swan
BY Munn & Co
ATTORNEYS.

N. PETERS, PHOTO-LITHOGRAPHER, WASHINGTON, D. C.

UNITED STATES PATENT OFFICE.

THOMAS B. SWAN, OF FOREST CITY, ARKANSAS, ASSIGNOR TO HIMSELF AND OTHELLO E. DORRIS, OF SAME PLACE.

IMPROVEMENT IN SEED-PLANTERS.

Specification forming part of Letters Patent No. 201,715, dated March 26, 1878; application filed January 16, 1878.

*To all whom it may concern:*

Figure 1:
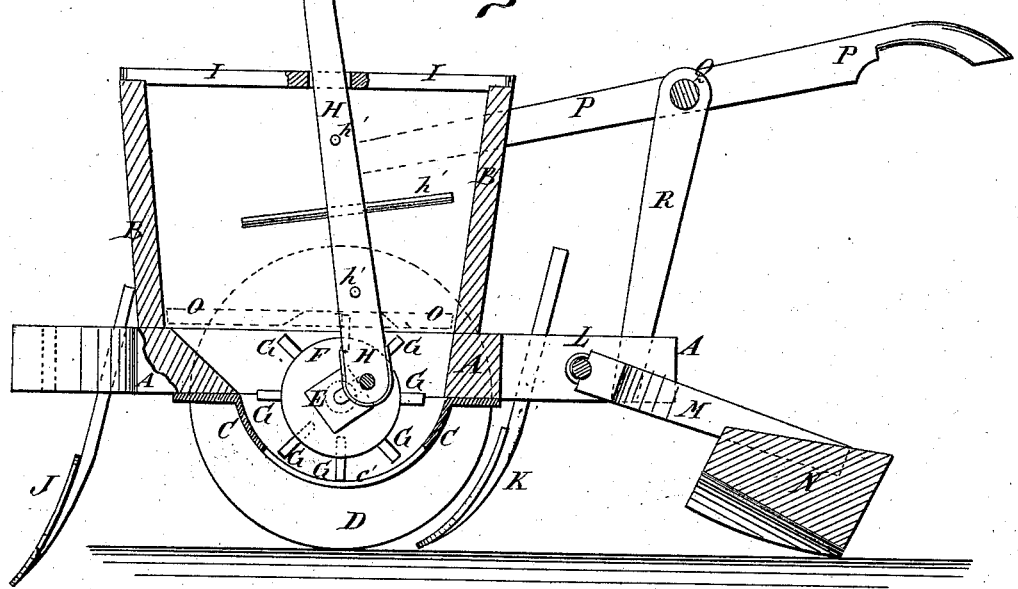
Figure 2:
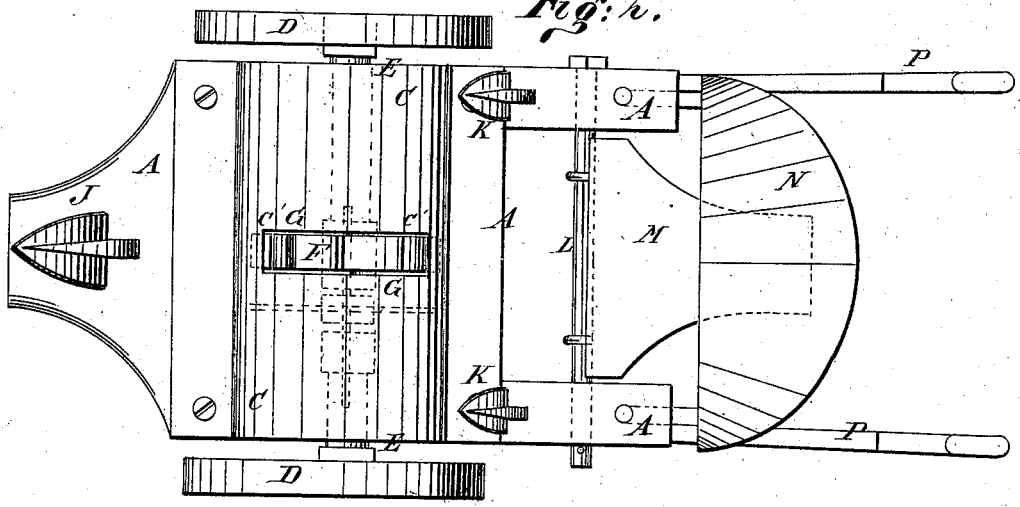

Be it known that I, THOMAS B. SWAN, of Forest City, in the county of St. Francis and State of Arkansas, have invented a new and useful Improvement in Seed-Planters, of which the following is a specification:

Figure 1 is a vertical longitudinal section of my improved seed-planter. Fig. 2 is a bottom view of the same.

Similar letters of reference indicate corresponding parts.

The invention will first be described in connection with the drawing, and then pointed out in the claim.

A is the frame of the planter, to the upper side of which is attached the seed-hopper B, and to its lower side is attached the semi-tubular bottom C. D are the wheels, which are rigidly attached to the ends of the axle E. The axle E revolves in bearings attached to the lower side of the side bars of the frame A. To the center of the axle E is attached a wheel, F, in the rim of which are formed a number of holes, in which are inserted a number of teeth, G, which take hold of the cotton-seeds and push them out through the slot $c'$ in the bottom C.

H is an upright bar, the lower end of which is connected with a crank or an eccentric formed upon or attached to the axle E at the side of the dropping-wheel F. The upper end of the bar H slides up and down through a guide-hole in the bar I, the ends of which are attached to the upper edge of the opposite sides of the hopper B. To the bar H are attached a number of cross-pins, $h'$, which, as the bar H moves up and down, keep the cotton-seed stirred up and pushed down, so that it may be fed out uniformly by the teeth G of the dropping-wheel F. The furrow is opened to receive the seed by a plow, J, the shank of which is attached to the forward part of the frame A. To the rear part of the frame A are attached the shanks of two plows, K, to cover the seed. To the rear part of the frame A is attached a rod, L, to which is hinged the wide forward end of a short bar, M. To the rear end of the bar M is rigidly attached a covering-block, N, which is concaved upon the lower side to give a proper form to the top of the row.

The plows K may be used for covering the seed, or the block M N, or both plows and block, according to the condition of the soil.

When the machine is to be used for planting corn, pease, or other smooth seeds, the bar H is detached from the axle E, the teeth G are detached from the wheel F, and the false bottom O is placed in the lower part of the hopper B upon the frame A, as shown in dotted lines in Fig. 1.

In the middle part of the false bottom O is formed a slot, through which the rim of the wheel F projects, to receive the seed in its holes and drop it into the furrow. Any desired number of the holes in the wheel F may be closed, according as the seed is to be dropped wider apart or closer together.

P are the handles, the forward ends of which are attached to the sides of the hopper B. The rear parts of the handles P are attached to the ends of a round, Q, which passes through the upper ends of the standards R. The lower ends of the standard R are attached to the rear ends of the side bars of the frame A.

Having thus described my invention, I claim as new and desire to secure by Letters Patent—

The combination of the teeth G, the bar H, provided with the cross-pins $h'$, and the guide-bar I with the wheel F, and the crank or eccentric upon the axle E, and with the frame A, the hopper B, and the slotted semi-tubular bottom C, substantially as herein shown and described.

THOMAS BYRN SWAN.

Witnesses:
P. M. COBBS,
H. C. DAVIS.